United States Patent
Sekiguchi et al.

(10) Patent No.: US 10,543,728 B2
(45) Date of Patent: Jan. 28, 2020

(54) END PLATE OF SUSPENSION MEMBER (71) Applicant: F-TECH INC., Kuki-shi, Saitama (JP)

(72) Inventors: Ryouta Sekiguchi, Haga-gun (JP); Masayuki Sasaki, Haga-gun (JP)

(73) Assignee: F-TECH INC., Kuki-shi (JP)

( * ) Notice: Subject to any disclaimer, the term of this patent is extended or adjusted under 35 U.S.C. 154(b) by 155 days.

(21) Appl. No.: 15/509,418

(22) PCT Filed: Sep. 14, 2015

(86) PCT No.: PCT/JP2015/075974
§ 371 (c)(1),
(2) Date: Mar. 7, 2017

(87) PCT Pub. No.: WO2016/052153
PCT Pub. Date: Apr. 7, 2016

(65) Prior Publication Data
US 2017/0282663 A1 Oct. 5, 2017

(30) Foreign Application Priority Data
Oct. 3, 2014 (JP) ................... 2014-204691

(51) Int. Cl.
*B60G 9/04* (2006.01)
(52) U.S. Cl.
CPC ............ *B60G 9/04* (2013.01); *B60G 2202/13* (2013.01); *B60G 2204/4307* (2013.01)
(58) Field of Classification Search
CPC .............................. B60G 9/04; B60G 2206/50
See application file for complete search history.

(56) References Cited

U.S. PATENT DOCUMENTS

| 5,507,518 A | 4/1996 | Nakahara et al. |
| 8,220,810 B2 * | 7/2012 | Jakob ...................... B60G 3/14 280/124.116 |

(Continued)

FOREIGN PATENT DOCUMENTS

| CN | 1467101 A | 1/2004 |
| CN | 1931619 A | 3/2007 |

(Continued)

OTHER PUBLICATIONS

Machine translation of DE4008706 (Year: 2018).*

(Continued)

*Primary Examiner* — Barry Gooden, Jr.
(74) *Attorney, Agent, or Firm* — Westerman, Hattori, Daniels & Adrian, LLP (57) ABSTRACT

There is provided an end plate that includes a through hole that causes an outer wall portion and an inner wall portion to communicate with each other, into which an intruding portion provided in a wheel-side member can intrude, a first press-formed portion formed by depressing in a peripheral edge of the through hole in the inner wall portion. The end plate includes a second press-formed portion arranged in a part of a peripheral edge on the side of a peripheral end of the inner wall portion, which is a remnant of a portion where the first press-formed portion is arranged in the inner wall portion, and formed therein with a protruding portion by protruding a part of the peripheral edge, and a screw hole formed by penetrating through the protruding portion in the second press-formed portion between the outer wall portion and the inner wall portion.

5 Claims, 5 Drawing Sheets

(56) References Cited

U.S. PATENT DOCUMENTS

| | | | |
|---|---|---|---|
| 8,342,547 B2* | 1/2013 | Gerrard | B60G 3/26 280/124.128 |
| 8,899,533 B2* | 12/2014 | Lucas | B60T 17/046 138/106 |
| 2004/0007846 A1 | 1/2004 | Inoue et al. | |
| 2007/0052192 A1* | 3/2007 | Kawanobe | B60G 7/008 280/124.13 |
| 2007/0290474 A1* | 12/2007 | Inoue | B60G 7/008 280/124.166 |
| 2009/0224503 A1* | 9/2009 | Richardson | B60B 35/08 280/124.116 |
| 2010/0059961 A1 | 3/2010 | Kato et al. | |
| 2010/0314933 A1* | 12/2010 | Jakob | B60G 3/14 301/124.1 |
| 2011/0056785 A1* | 3/2011 | Marquar | B60G 15/07 188/322.19 |
| 2012/0013095 A1* | 1/2012 | Gerrard | B60G 3/26 280/124.134 |
| 2014/0197285 A1* | 7/2014 | Lucas | B60T 17/046 248/75 |
| 2015/0352918 A1* | 12/2015 | Peitz | B60G 7/001 280/124.128 |
| 2017/0120707 A1* | 5/2017 | Bauer | B60G 9/04 |
| 2017/0282663 A1* | 10/2017 | Sekiguchi | B60G 9/04 |

FOREIGN PATENT DOCUMENTS

| | | |
|---|---|---|
| CN | 201907930 U | 7/2011 |
| DE | 4008706 A1 | 9/1991 |
| EP | 1380455 A3 | 1/2004 |
| EP | 1757468 A1 | 2/2007 |
| EP | 1832448 A1 | 9/2007 |
| EP | 2 221 196 A1 | 8/2010 |
| FR | 2 966 771 A1 | 5/2012 |
| JP | 2004-42690 A | 2/2004 |
| JP | 2008-195154 A | 8/2008 |
| JP | 2009-161151 A | 7/2009 |
| WO | 2013/038580 A1 | 3/2013 |

OTHER PUBLICATIONS

International Search Report dated Nov. 17, 2015, issued in counterpart International Application No. PCT/JP2015/075974 (1 page).
Office Action dated Jun. 5, 2018, issued in counterpart Chinese Application No. 201580044858.0, with English translation. (10 pages).
Extended (supplementary) European Search Report dated May 22, 2018, issued in counterpart European Application No. 15846498.2. (8 pages).

* cited by examiner

END PLATE OF SUSPENSION MEMBER

TECHNICAL FIELD

The present invention relates to an end plate, and more particularly relates to an end plate of a suspension member attached to an end of a vehicle suspension member.

BACKGROUND ART

In recent years, various configurations have been adopted to a suspension system of a vehicle such as a four-wheeled automobile. Among these configurations, a bilateral pair of cylindrical trailing arms that extends in a longitudinal direction of a vehicle body and connects the vehicle body with corresponding wheels has been adopted for the rear suspension system of a four-wheeled automobile.

Because the wheels need to be attached to the trailing arms, it is necessary to provide a member for attaching the wheels in the trailing arms. As the member for attaching the wheels in the trailing arms, there is provided an end plate being a plate-like metal member.

The end plate being a plate-like metal member is a trailing-arm side member attached to a rear end of the cylindrical trailing arm so as to block a rear-end opening. Therefore, it is necessary that the end plate is fixedly provided in the trailing arm reliably and is reliably attached with a wheel-side member for attaching the wheels, while ensuring required mechanical strength and stiffness of the end plate. Further, because the end plate is a trailing arm-side member of a suspension system, weight saving so as not to degrade the required mechanical strength and stiffness of the end plate is desired.

Under such circumstances, Patent Literature 1 relates to a torsion beam suspension and a manufacturing method thereof, and discloses a configuration in which a wheel attaching flange 2 is welded to a pipe-like side arm 1, and a protruded surface 3 is formed on the wheel attaching flange 2 on the side facing the pipe-like side arm 1.

PRIOR ART DOCUMENT

Patent Document

Patent Document 1: European Patent Application Publication No. 2221196

SUMMARY OF THE INVENTION

Problem to be Solved by the Invention

However, according to the studied made by the present inventors, in the configuration of Patent Literature 1, a weld pool surrounding function is achieved by providing the protruded surface 3 on the wheel attaching flange 2 and matching the protruded surface 3 and an inner profile of the pipe-like side arm 1 with each other. Further, a through hole is formed in a portion of the wheel attaching flange 2 where the protruded surface 3 and a wheel fastening portion are not provided to achieve weight saving, while improving the welding strength to the pipe-like side arm 1. However, in the configuration of Patent Literature 1, the protruded surface 3 and the wheel fastening portion are only added to the basic configuration of a curved structure in which a plate-like base material is bent.

That is, in the configuration of Patent Literature 1, although the through hole is provided, the weight, strength, and stiffness of the wheel attaching flange 2 are determined substantially according to the plate thickness of the plate-like base member. Therefore, even if it is attempted to reduce the plate thickness in order to achieve weight saving, the plate thickness cannot be reduced to a plate thickness thinner than the plate thickness required for ensuring the required strength and stiffness, and thus it can be considered that there are certain limitations in weight saving of the wheel attaching flange 2.

The present invention has been achieved in view of the problems described above, and an object of the present invention is to provide an end plate of a suspension member that can realize weight saving, while realizing high strength and stiffness with a simple configuration suitable for mass production.

Means for Solving the Problem

In order to achieve the above object, an end plate, made of metal, of a suspension member to be attached to the suspension member according to a first aspect of the present invention comprises: an outer wall portion to which a wheel-side member is to be attached; an inner wall portion to be arranged inside a suspension member, facing the outer wall portion; a side peripheral-wall portion connecting a peripheral end of the outer wall portion and a peripheral end of the inner wall portion with each other; a through hole causing a central part of the outer wall portion and a central part of the inner wall portion to communicate with each other, into which an intruding portion provided in the wheel-side member is to intrude; a first press-formed portion extending along a peripheral edge of the through hole in the inner wall portion and formed with a recessed portion formed by depressing in the peripheral edge; a second press-formed portion arranged in a part of the peripheral edge on a side of the peripheral end of the inner wall portion, which is a remnant of a portion where the first press-formed portion is arranged in the inner wall portion, with a protruding portion formed therein by protruding a part of the peripheral edge; and a screw hole formed by penetrating through the protruding portion in the second press-formed portion between the outer wall portion and the inner wall portion.

According to a second aspect of the present invention, in addition to the first aspect, the recessed portion in the first press-formed portion is formed by press molding to apply a pressing force directed from the inner wall portion toward the outer wall portion, and the protruding portion in the second press-formed portion is formed by press molding to apply a pressing force directed from the outer wall portion toward the inner wall portion.

According to a third aspect of the present invention, in addition to the first or second aspect, the protruding portion in the second press-formed portion is arranged in plural so as to surround the recessed portion in the first press-formed portion.

According to a fourth aspect of the present invention, in addition to any one of the first to third aspects, the peripheral edge on a side of the peripheral end of the inner wall portion has a rib shape having a plate thickness maintaining a plate thickness of a plate-like base member of the end plate.

According to a fifth aspect of the present invention, in addition to the fourth aspect, the peripheral edge having a rib shape extends to connect the protruding portions arranged in plural so as to surround the recessed portion in the first press-formed portion.

Effect of the Invention

According to the configuration of the first aspect of the present invention, an end plate, made of metal, of a suspension member includes a through hole that connects a central part of an outer wall portion with a central part of an inner wall portion, into which an intruding portion provided in a wheel-side member is to intrude, a first press-formed portion formed with a recessed portion that is formed by depressing in a peripheral edge of the through hole in the inner wall portion, a second press-formed portion arranged in a part of the peripheral edge on a peripheral end side of the inner wall portion, which is a remnant of a portion where the first press-formed portion is arranged in the inner wall portion, and formed with a protruding portion formed by protruding apart thereof, and a screw hole formed by penetrating through the protruding portion in the second press-formed portion between the outer wall portion and the inner wall portion. Accordingly, the end plate for a suspension member that can realize weight saving, while realizing high strength and stiffness, can be realized with a simple configuration suitable for mass production.

According to the configuration of the second aspect of the present invention, the recessed portion in the first press-formed portion is formed by press molding that applies a pressing force directed from the inner wall portion toward the outer wall portion. The protruding portion in the second press-formed portion is formed by press molding that applies a pressing force directed from the outer wall portion toward the inner wall portion. Accordingly, the recessed portion in the first press-formed portion and the protruding portion in the second press-formed portion can be formed accurately, reliably, and simply.

According to the configuration of the third aspect of the present invention, the protruding portion in the second press-formed portion is arranged in plural so as to surround the recessed portion in the first press-formed portion. Accordingly, the screw hole formed in each of the protruding portions is used as a fastening hole of the wheel-side member, into which a fastening member such as a bolt is fastened. Therefore, the fastening force of the wheel-side member can be increased as a whole, in a mode in which the fastening force of the wheel-side member with respect to the end plate is dispersed corresponding to each of the protruding portions.

According to the configuration of the fourth aspect of the present invention, the peripheral edge on the side of the peripheral end of the inner wall portion has a rib shape having a plate thickness maintaining a plate thickness of the plate-like base member of the end plate. Accordingly, the strength of the end plate over the entire periphery can be increased, while reliably molding the recessed portion of the first press-formed portion that is formed thinner than the peripheral edge and the protruding portion of the second press-formed portion that is formed thicker than the peripheral edge.

According to the configuration of the fifth aspect of the present invention, the peripheral edge having a rib shape extends to connect the protruding portions arranged in plural so as to surround the recessed portion in the first press-formed portion. Accordingly, the peripheral edge having a rib shape are present between adjacent protruding portions to connect these protruding portions correspondingly, thereby enabling to further increase the strength of the end plate over the entire periphery.

EMBODIMENT FOR CARRYING OUT THE INVENTION

Embodiments of an end plate for a suspension member according to the present invention will be explained below in detail with reference to the accompanying drawings. In the drawings, an x-axis, a y-axis, and a z-axis form a three-dimensional orthogonal coordinate system.

Configurations of an end plate according to an embodiment of the present invention is described in detail with reference to FIGS. 1A and 1B.

Figure 1:
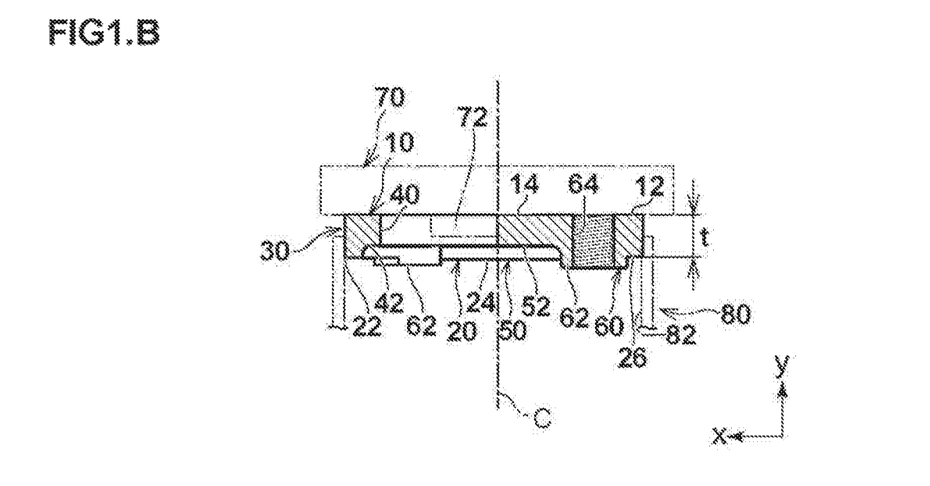
FIG. 1A is a view showing an inner wall portion side of an end plate according to an embodiment of the present invention.
FIG. 1B is a sectional view along a line A-A in FIG. 1A.
Figure 1A:
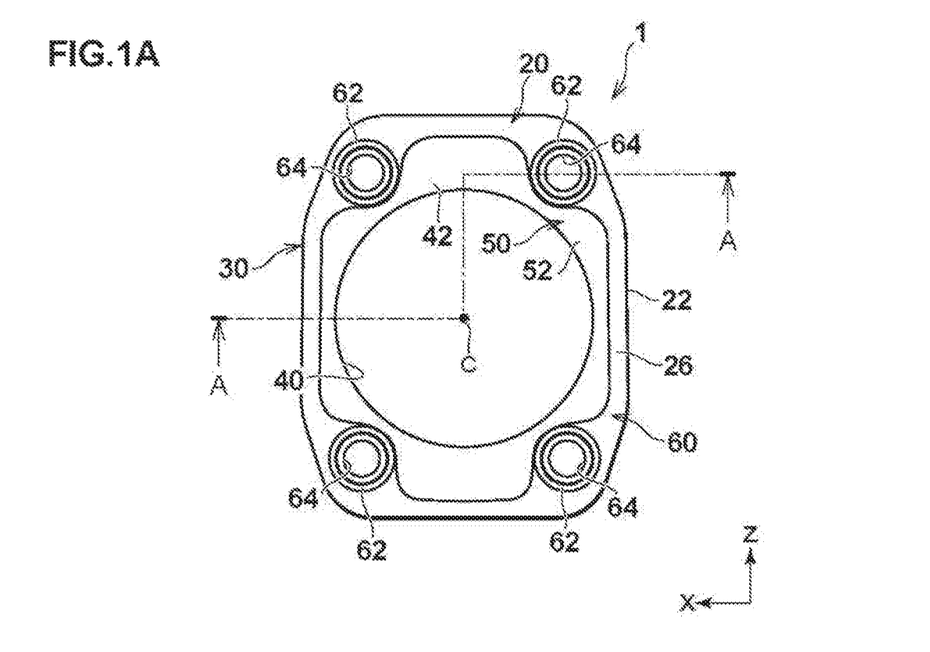

FIG. 1A is a view showing an inner wall portion side of the end plate according to the present embodiment. FIG. 1B is a sectional view along a line A-A in FIG. 1A. In FIG. 1B, the end plate is shown together with a wheel-side member and a suspension member of a vehicle.

As shown in FIGS. 1A and 1B, an end plate 1 is a press formed article that is attached with a wheel-side member of a vehicle, attached to a suspension member of the vehicle, and manufactured through a plurality of press molding processes from a base member, which is a solid plate member made of metal such as an iron material. The wheel-side member and the suspension member are typically attached to the vehicle body in a pair to right and left of the vehicle.

Specifically, the end plate 1 includes an outer wall portion 10 formed of a wall surface, which is a plane parallel to an x-z plane, an inner wall portion 20 facing the outer wall portion 10 on a negative direction of a y-axis, a side peripheral-wall portion 30 that connects a peripheral end 12 of the outer wall portion 10 and a peripheral end 22 of the inner wall portion 20 with each other in the y-axis direction, a through hole 40 that causes a central part 14 of the outer wall portion 10 and a central part 24 of the inner wall portion 20 to communicate with each other in the y-axis direction. The end plate 1 also includes a first press-formed portion 50 extending around along a peripheral edge 42 as a marginal area of the through hole 40 in the inner wall portion 20 and formed with a recessed portion 52 that is formed by depressing in the peripheral edge 42 on a positive direction of the y-axis, and a second press-formed portion 60 arranged in a part of a peripheral edge 26 as a marginal area on the side of the peripheral end 22 of the inner wall portion 20, which is a remnant of a part where the first press-formed portion 50 is arranged in the inner wall portion 20, with a protruding portion 62 formed therein by protruding a part of the peripheral edge 26 on the negative direction of the y-axis. The end plate 1 further includes a screw hole 64 formed by penetrating through the protruding portion 62 in the second press-formed portion 60 in the y-axis direction. Typically, the end plate 1 has a central axis C parallel to the y-axis direction, and has a configuration axial symmetric to the central axis C.

The wall surface, which is a plane parallel to the x-z plane of the outer wall portion 10, becomes a matching surface at the time of attaching a wheel-side member 70 such as a rear spindle assembly and a rear hub assembly of a vehicle.

The recessed portion 52 of the first press-formed portion 50 and the protruding portion 62 of the second press-formed portion 60 are formed on the wall surface of the inner wall portion 20, and other parts are not attached thereto. The inner wall portion 20 is positioned in an inner space of a suspension member 80 when the end plate 1 is attached to the cylindrical suspension member 80 such as a rear trailing arm of a vehicle.

When the end plate 1 is attached to the suspension member 80, the side peripheral-wall portion 30 is inserted into an opening 82 that opens the inner space of the suspension member 80, and is continuously or intermittently welded to a peripheral edge of the suspension member 80 in the opening 82.

When the end plate 1 is attached to the suspension member 80, the through hole 40 causes the inner space of the suspension member 80 whose opening 82 is to be blocked by the end plate 1 to communicate with the outside. The through hole 40 contributes to weight saving of the end plate 1, and allows an intruding portion 72 of the wheel-side member 70, that is, flared portions of the rear spindle assembly and the rear hub assembly to intrude into the inner space of the suspension member 80 via the through hole 40.

It is desired to form the first press-formed portion 50 by press-molding that applies a pressing force directed from the inner wall portion 20 toward the outer wall portion 10, that is, a pressing force toward the positive direction of the y-axis. At the time of press molding, the first press-formed portion 50 can be reliably formed in such a manner that the recessed portion 52 extending around along the peripheral edge 42 of the through hole 40 in the inner wall portion 20 reduces the plate thickness of the base member, and the peripheral edge 42 is depressed on the positive direction of the y-axis.

It is desired to form the second press-formed portion 60 by press-molding that applies a pressing force directed from the outer wall portion 10 toward the inner wall portion 20, that is, a pressing force toward the negative direction of the y-axis. At the time of press molding, the second press-formed portion 60 can be reliably formed in such a manner that the protruding portion 62 arranged in a part of the peripheral edge 26 on the side of the peripheral end 22 of the inner wall portion 20, which is a remnant of a part where the first press-formed portion 50 is arranged in the inner wall portion 20, increases the plate thickness of the base member, and a part of the peripheral edge 26 is protruded on the negative direction of the y-axis.

It is desired that the protruding portion 62 in the second press-formed portion 60 is provided in plural so as to surround the recessed portion 52 in the first press-formed portion 50. Typically, it is desired that four protruding portions 62 are provided axial symmetrically to the central axis C, that is, one on the positive direction of an x-axis and on the positive direction of a z-axis, one on the negative direction of the x-axis and on the positive direction of the z-axis, one on the positive direction of the x-axis and on the negative direction of the z-axis, and one on the negative direction of the x-axis and on the negative direction of the z-axis, and provided adjacent to the recessed portion 52, surrounding the recessed portion 52 on the outer side. This is because the screw holes 64 formed in the respective protruding portions 62 are used respectively as a fastening hole to which a fastening member such as a bolt (not shown) of the wheel-side member 70 is fastened, and a fastening force of the wheel-side member 70 with respect to the end plate 1 can be increased as a whole in such a manner that the fastening force is dispersed corresponding to the respective protruding portions 62. If the protruding portions 62 are provided in plural, though not shown, the end plate 1 can be attached to the suspension member 80 by inserting the protruding portions 62 into the opening 82 of the suspension member 80 as required.

It is further desired that the peripheral edge 26 on the side of the peripheral end 22 of the inner wall portion 20 has a rib shape having a plate thickness t that maintains the plate thickness of the plate-like base member of the end plate 1, from a viewpoint of increasing the strength of the end plate 1 over the entire periphery, while reliably molding the recessed portion 52 of the first press-formed portion 50 that is formed thinner than the peripheral edge 26 and the protruding portions 62 of the second press-formed portion 60 that is formed thicker than the peripheral edge 26. At this time, if the protruding portion 62 of the second press-formed portion 60 is provided in plural, it is desired from a viewpoint of increasing the strength of the end plate 1 over the entire periphery that the rib-shaped peripheral edge 26 is present between the adjacent protruding portions 62 to connect these correspondingly.

Furthermore, it is desired that the second press-formed portion 60 is formed after the first press-formed portion 50 is formed. This is because after the recessed portion 52 is formed at the time of press molding of the first press-formed portion 50 and the material of the base member at that portion is moved to the side of the peripheral end 12 of the outer wall portion 10 and the peripheral end 22 of the inner wall portion 20, the relatively thicker protruding portions 62 can be reliably formed at the time of press molding of the second press-formed portion 60, while forming the rib-shaped peripheral edge 26 that maintains the thickness of the base member in the moved material portion.

A manufacturing method of the end plate 1 according to the present embodiment is described next in detail with reference to FIG. 2A to FIG. 3D.

Figure 2A:
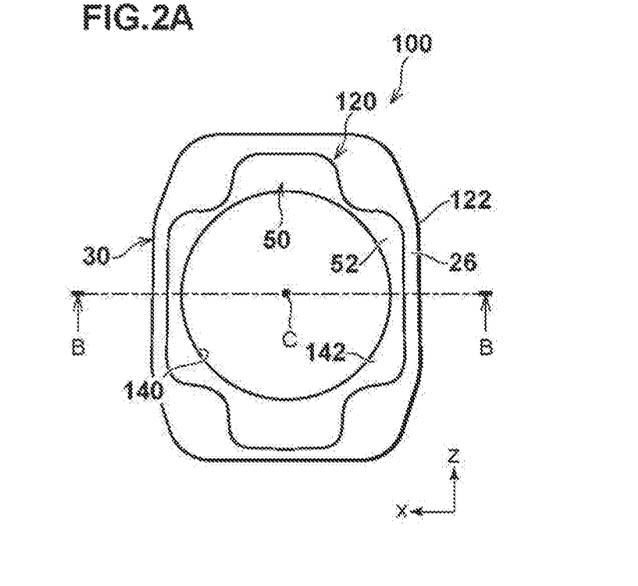
FIG. 2A is a view corresponding to a first process to manufacture an intermediate formed article obtained in a process sequence according to a manufacturing method of an end plate of the present embodiment, showing an inner wall portion side of a first intermediate formed article of the end plate according to the present embodiment.
Figure 2B:
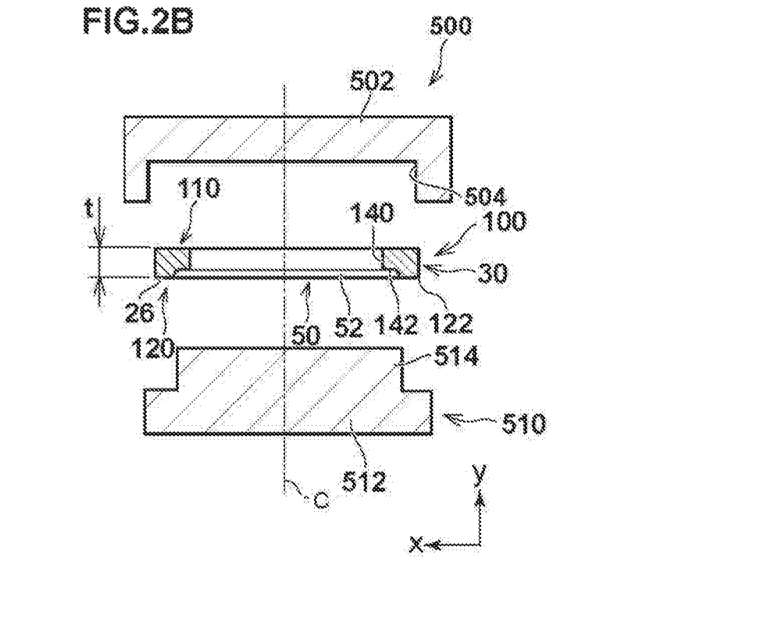
FIG. 2B is a view showing the first process to manufacture the first intermediate formed article shown in FIG. 2A, and positionally corresponds to a section along a line B-B in FIG. 2A.
Figure 2C:
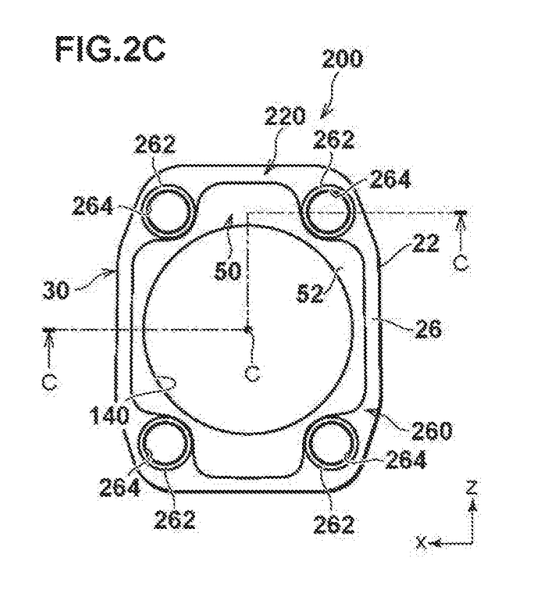
FIG. 2C is a view corresponding to a second process subsequent the first process to manufacture an intermediate formed article obtained in a process sequence according to the manufacturing method of an end plate of the present embodiment, showing an inner wall portion side of a second intermediate formed article of the end plate according to the present embodiment.
Figure 2D:
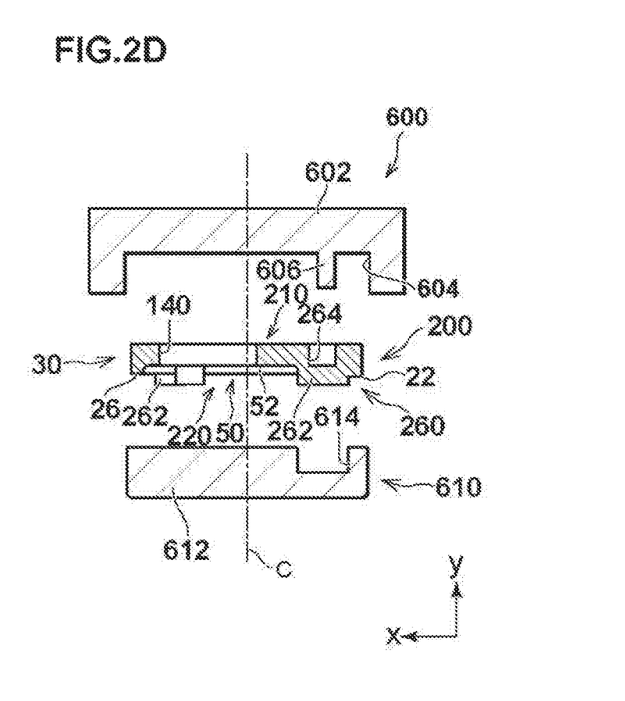
FIG. 2D is a view showing the second process to manufacture the second intermediate formed article shown in FIG. 2C subsequent to the first process shown in FIG. 2B, and positionally corresponds to a section along a line C-C in FIG. 2C.
Figure 3A:
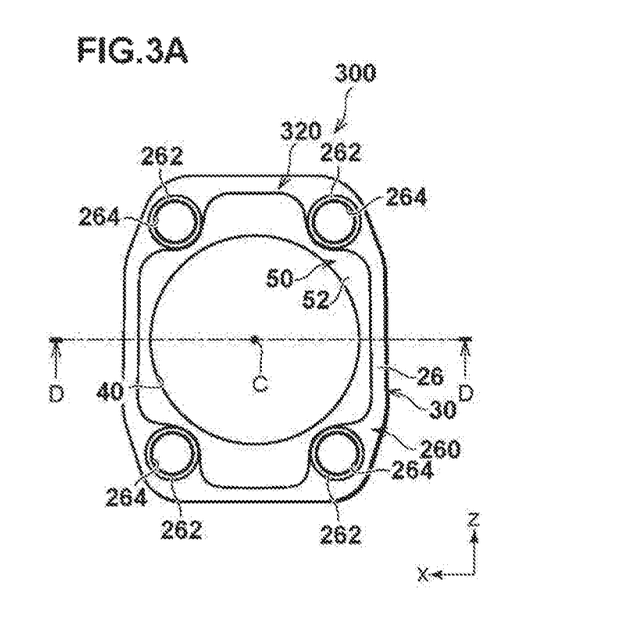
FIG. 3A is a view corresponding to a third process subsequent to the second process to manufacture an intermediate formed article obtained in a process sequence according to the manufacturing method of an end plate of the present embodiment, showing an inner wall portion side of a third intermediate formed article of the end plate according to the present embodiment.
Figure 3B:
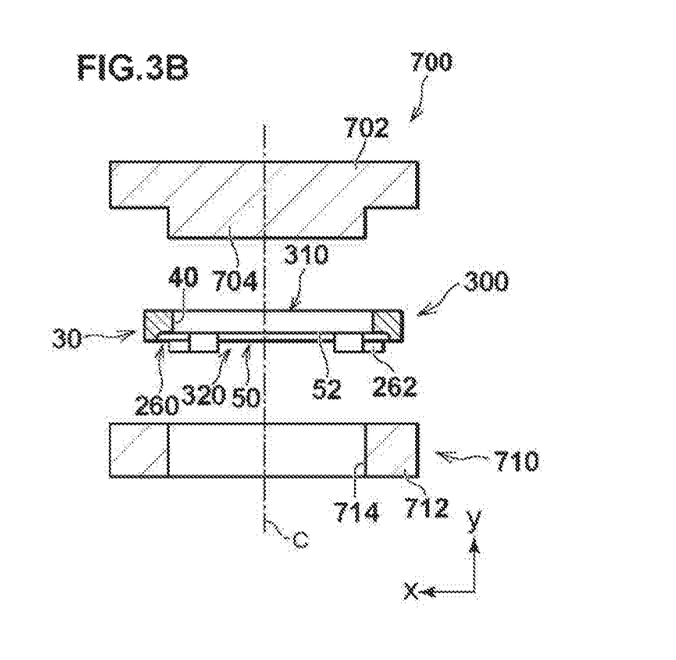
FIG. 3B is a view showing the third process to manufacture the third intermediate formed article shown in FIG. 3A subsequent to the second process shown in FIG. 2D, and positionally corresponds to a section along a line D-D in FIG. 3A.
Figure 3C:
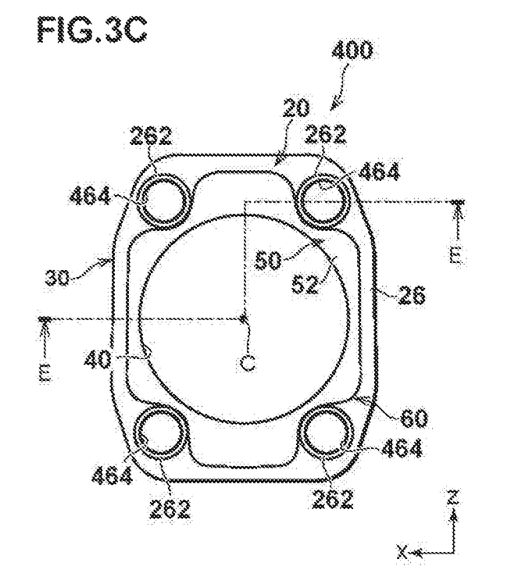
FIG. 3C is a view corresponding to a fourth process subsequent the third process to manufacture an intermediate formed article obtained in a process sequence according to the manufacturing method of an end plate of the present embodiment, showing an inner wall portion side of a fourth intermediate formed article of the end plate according to the present embodiment.
Figure 3D:
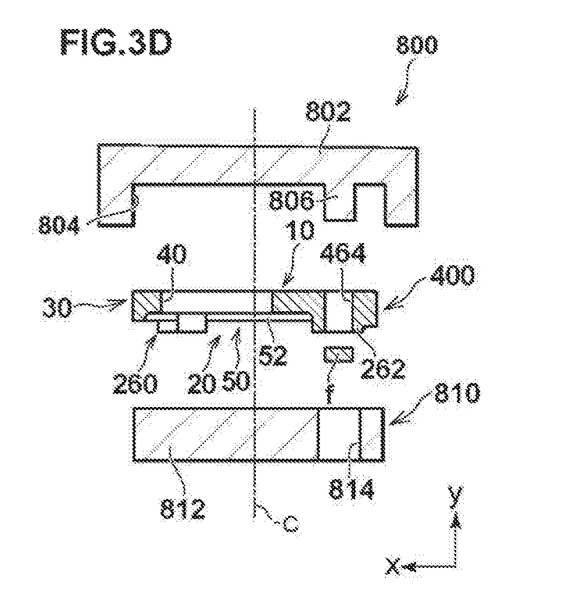
FIG. 3D is a view showing the fourth process to manufacture the fourth intermediate formed article shown in FIG. 3C subsequent to the third process shown in FIG. 3B, and positionally corresponds to a section along a line E-E in FIG. 3C.

FIG. 2A is a view showing an inner wall portion side of a first intermediate formed article of the end plate according to the present embodiment. FIG. 2B is a view showing a first process to manufacture the first intermediate formed article shown in FIG. 2A, and positionally corresponds to a section along a line B-B in FIG. 2A. FIG. 2C is a view showing an inner wall portion side of a second intermediate formed article of the end plate according to the present embodiment. FIG. 2D is a view showing a second process to manufacture the second intermediate formed article shown in FIG. 2C subsequent to the first process shown in FIG. 2B, and positionally corresponds to a section along a line C-C in FIG. 2C. FIG. 3A is a view showing an inner wall portion side of a third intermediate formed article of the end plate according to the present embodiment. FIG. 3B is a view showing a third process to manufacture the third intermediate formed article shown in FIG. 3A subsequent to the second process shown in FIG. 2D, and positionally corresponds to a section along a line D-D in FIG. 3A. FIG. 3C is a view showing an inner wall portion side of a fourth intermediate formed article of the end plate according to the present embodiment. FIG. 3D is a view showing a fourth process to manufacture the fourth intermediate formed article shown in FIG. 3C subsequent to the third process shown in FIG. 3B, and positionally corresponds to a section along a line E-E in FIG. 3C. In FIG. 2B, FIG. 2D, FIG. 3B, and FIG. 3D, a forming die is shown in a separated state for the sake of explanation.

First, as shown in FIG. 2A and FIG. 2B, a first intermediate formed article 100 is manufactured from a preliminary formed article (not shown) by using a first mold 500 and a second mold 510.

The preliminary formed article has a configuration such that a through hole 140 directly provided in the first intermediate formed article 100 is preliminarily bored at the center thereof, from a base member (not shown) that is a flat plate member made of metal such as an iron material, the shape of the side peripheral-wall portion 30 is preliminarily formed in the shape of the side peripheral-wall portion 30 of the end plate 1 being the final formed article, and the outer wall portion and the inner wall portion are planar portions facing each other in parallel that maintain these portions of the base member.

The first mold 500 includes a mold body 502 and a recessed portion 504 formed by depressing in a part of the mold body 502 in the positive direction of the y-axis. The second mold 510 includes a mold body 512 and a protruding portion 514 formed by protruding a part of the mold body 512 in the positive direction of the y-axis.

The first intermediate formed article 100 is manufactured by housing the preliminary formed article between the first mold 500 and the second mold 510 having the configurations described above, and moving the first mold 500 and the second mold 510 relatively to the y-axis direction to depress the preliminary formed article.

In the first intermediate formed article 100, a first press-formed portion 50 extending around along a peripheral edge 142 as a marginal area of the through hole 140 in an inner wall portion 120 and formed with a recessed portion 52 that is formed by depressing in the peripheral edge 142 in the positive direction of the y-axis is formed with respect to the preliminary formed article. The first press-formed portion 50 is formed in such a manner that the first mold 500 and the second mold 510 relatively move in the y-axis direction, in a state where an outer wall portion 110 abuts on the bottom portion of the recessed portion 504 of the first mold 500 and the peripheral edge 142 of the through hole 140 in the inner wall portion 120 abuts on the top of the protruding portion 514 of the second mold 510, to depress the peripheral edge 142 of the through hole 140 in the positive direction of the y-axis. The first press-formed portion 50 is maintained as it is in the subsequent molding process and becomes the first press-formed portion 50 of the end plate 1.

At this time, the side peripheral-wall portion 30 is held by a side wall portion of the recessed portion 504 of the first mold 500. Therefore, a side peripheral-wall portion of the preliminary formed article is maintained as it is, and is also maintained as it is in the subsequent molding process and becomes the side peripheral-wall portion 30 of the end plate 1. Further, because the peripheral edge 26 is held between the mold body 502 of the first mold 500 and the mold body 512 of the second mold 510, the plate thickness of the base member is maintained as it is. Therefore, the plate thickness t of the first intermediate formed article 100 in a portion of the peripheral edge 26 on the side of the peripheral end 122 of the inner wall portion 120 is maintained as it is in the subsequent molding process and becomes the plate thickness of the rib-shaped peripheral edge 26 of the end plate 1. The screw hole 64 that penetrates between the outer wall portion 110 and the inner wall portion 120 is not provided in the first intermediate formed article 100.

As shown in FIG. 2C and FIG. 2D, a second intermediate formed article 200 is manufactured from the first intermediate formed article 100 by using a third mold 600 and a fourth mold 610.

The third mold 600 includes a mold body 602, a recessed portion 604 formed by depressing in a part of the mold body 602 in the positive direction of the y-axis, and a protruding portion 606 formed by protruding a part of the recessed portion 604 in the negative direction of the y-axis so that a part of the mold body 602 remains without being depressed in. The fourth mold 610 includes a mold body 612 and a recessed portion 614 formed by depressing in a part of the mold body 612 in the negative direction of the y-axis.

The first intermediate formed article 100 is housed between the third mold 600 and the fourth mold 610 having the configurations described above. By relatively moving the third mold 600 and the fourth mold 610 in the y-axis direction to depress the first intermediate formed article 100, the second intermediate formed article 200 is manufactured.

In the second intermediate formed article 200, there are further formed, with respect to the first intermediate formed article 100, a recessed portion 264 formed by depressing in a part of an outer wall portion 210 in the negative direction of the y-axis, and a protruding portion 262 formed by protruding a part of the inner wall portion 220 in the negative direction of the y-axis corresponding to the recessed portion 264. The recessed portion 264 is formed by relatively moving the third mold 600 and the fourth mold 610 in the y-axis direction in a state where the protruding portion 606 of the third mold 600 abuts on a part of the outer wall portion 210, to depress the part of the outer wall portion 210 in the negative direction of the y-axis.

In association with molding of the recessed portion 264, the material of the second intermediate formed article 200 flows in the negative direction of the y-axis, and a part of the inner wall portion 220 facing the recessed portion 264 bulges toward the negative direction of the y-axis and is housed in the recessed portion 614 of the fourth mold 610. Further, at this time, a part of the inner wall portion 220 housed in the recessed portion 614 abuts on a bottom portion and a side wall portion of the recessed portion 614 so that bulging thereof is restricted. Therefore, a second press-formed portion 260 arranged in a part of the peripheral edge 26 on the side of the peripheral end 22 of the inner wall portion 220, which is a remnant of a portion where the first press-formed portion 50 is arranged in the inner wall portion 220, is formed with the protruding portion 262 being formed by protruding a part of the peripheral edge 26 on the negative direction of the y-axis. The outer contour shape of the second press-formed portion 260 formed with the protruding portion 262, and the peripheral edge 26 of the inner wall portion 220 and the peripheral end 22 being an end thereof continuous to the second press-formed portion 260 are maintained as it is in the subsequent molding process, to become the outer contour shape of the second press-formed portion 60 and the peripheral edge 26 and the peripheral end 22 of the inner wall portion 220 of the end plate 1. That is, the second press-formed portion 60 of the end plate 1 is obtained by the second intermediate formed article 200, except for the screw hole 64.

Subsequently, as shown in FIG. 3A and FIG. 3B, a third intermediate formed article 300 is manufactured from the second intermediate formed article 200 by using a fifth mold 700 and a sixth mold 710.

The fifth mold 700 includes a mold body 702 and a protruding portion 704 formed by protruding a part of the mold body 702 in the negative direction of the y-axis. The sixth mold 710 includes a mold body 712 and a through hole 714 formed by penetrating through a part of the mold body 712 in the y-axis direction.

The second intermediate formed article 200 is housed between the fifth mold 700 and the sixth mold 710 having the configurations described above. By relatively moving the fifth mold 700 and the sixth mold 710 in the y-axis direction to depress the second intermediate formed article 200, the third intermediate formed article 300 is manufactured.

In the third intermediate formed article 300, the through hole 40 penetrating between an outer wall portion 310 and an inner wall portion 140 is formed, in which the shape and the size of the through hole 140 provided in the second intermediate formed article 200 become the final specification. The through hole 40 is formed in such a manner that while the fifth mold 700 and the sixth mold 710 are relatively moved in the y-axis direction, the protruding portion 704 of the fifth mold 700 is inserted into the through hole 140 of the second intermediate formed article 200 to enter into the through hole 714 of the sixth mold 710, thereby punching the peripheral edge of the through hole 140 so that the shape and the size thereof become the final specification. The through hole 40 is maintained as it is in the subsequent molding process to become the through hole 40 of the end plate 1. A fragment obtained by punching the peripheral edge of the through hole 140 is discharged via the through hole 714 of the sixth mold 710. However, illustrations thereof are omitted for the sake of explanation.

As shown in FIG. 3C and FIG. 3D, a fourth intermediate formed article 400 is manufactured from the third intermediate formed article 300 by using a seventh mold 800 and an eighth mold 810.

The seventh mold 800 includes a mold body 802, a recessed portion 804 formed by depressing in a part of the mold body 802 in the positive direction of the y-axis, and a protruding portion 806 formed by protruding a part of the recessed portion 804 in the negative direction of the y-axis so that the part of the mold body 802 remains without being depressed in. The eighth mold 810 includes a mold body 812 and a through hole 814 that penetrates through a part of the model body 812 in the y-axis direction.

The third intermediate formed article 300 is housed between the seventh mold 800 and the eighth mold 810, and by relatively moving the seventh mold 800 and the eighth mold 810 in the y-axis direction to depress the third intermediate formed article 300, the fourth intermediate formed article is manufactured.

In the fourth intermediate formed article 400, a through hole 464 that penetrates between the recessed portion 264 and the protruding portion 262 provided in the third intermediate article 300 is formed. The through hole 464 is formed in such a manner that the protruding portion 806 of the seventh mold 800 enters into the recessed portion 264 of the third intermediate formed article 300 to expand the diameter thereof and perforate the bottom portion thereof, and enters into the through hole 814 of the eighth mold 810, while the seventh mold 800 and the eighth mold 810 are relatively moved in the y-axis direction. At this time, a side peripheral-wall portion of the protruding portion 262 is held by a peripheral wall portion of the through hole 814 of the eighth mold 810, and a fragment f formed by perforating the bottom portion of the recessed portion 264 of the third intermediate formed article 300 is discharged via the through hole 814 of the eighth mold 810. The respective wall structures of the outer wall portion 10 and the inner wall portion 20 in the fourth intermediate formed article 400 are the same as the respective wall structures of the outer wall portion 10 and the inner wall portion 20 in the end plate 1.

The through hole 464 in the fourth intermediate formed article 400 is machined to the screw hole 64 by using a threading member or the like (not shown) to finally manufacture the end plate 1, which is an end product.

According to the configuration of the present embodiment described above, the through hole 40 that causes the central part 14 of the outer wall portion 10 and the central part 24 of the inner wall portion 20 to communicate with each other, into which the intruding portion 72 provided in the wheel-side member 70 can intrude, the first press-formed portion 50 formed with the recessed portion 52 formed by depressing in the peripheral edge 42 of the through hole 40 in the inner wall portion 20, the second press-formed portion 60 arranged in a part of the peripheral edge 26 on the side of the peripheral end 22 of the inner wall portion 20, which is the remnant of the portion in the inner wall portion 20 where the first press-formed portion 50 is arranged, and formed with the protruding portion 62 formed by protruding a part thereof, and the screw hole 64 formed by penetrating through the protruding portion 62 in the second press-formed portion 60 between the outer wall portion 10 and the inner wall portion 20 are provided. Accordingly, the end plate 1 for a suspension member that can realize weight saving, while realizing high strength and stiffness, can be realized with a simple configuration suitable for mass production.

According to the configuration of the present embodiment, the recessed portion 52 in the first press-formed portion 50 is formed by press molding that applies a pressing force directed from the inner wall portion 20 toward the outer wall portion 10, and the protruding portion 62 in the second press-formed portion 60 is formed by press molding that applies a pressing force directed from the outer wall portion 10 toward the inner wall portion 20. Accordingly, the recessed portion 52 in the first press-formed portion 50 and the protruding portion 62 in the second press-formed portion 60 can be formed accurately and reliably.

According to the configuration of the present embodiment, the protruding portion 62 in the second press-formed portion 60 is arranged in plural so as to surround the recessed portion 52 in the first press-formed portion 50. Because the screw hole 64 formed in each of the protruding portions 62 is used as a fastening hole into which a fastening member such as a bolt of the wheel-side member 70 is fastened, the fastening force of the wheel-side member 70 with respect to the end plate 1 can be increased as a whole in a mode in which the fastening force thereof is dispersed corresponding to the respective protruding portions 62.

According to the configuration of the present embodiment, the peripheral edge 26 on the side of the peripheral end 22 of the inner wall portion 20 has a rib shape having a plate thickness t that maintains the plate thickness of the plate-like base member of the end plate 1. Accordingly, the strength of the end plate 1 over the entire periphery can be increased, while reliably molding the recessed portion 52 of the first press-formed portion 50 that is formed thinner than the peripheral edge 26 and the protruding portion 62 of the second press-formed portion 60 that is formed thicker than the peripheral edge 26.

According to the configuration of the present embodiment, the peripheral edge 26 having a rib shape extends to connect the protruding portions 62 arranged in plural so as to surround the recessed portion 50 in the first press-formed portion 50. Accordingly, the rib-shaped peripheral edge 26 can be present between the adjacent protruding portions 62 to connect these protruding portions 62 correspondingly, thereby enabling to further increase the strength of the endplate 1 over the entire periphery.

In the present invention, the type, the form, the arrangement, the number, and the like of the constituent members are not limited to those in the embodiment explained above, and it is needless to mention that the constituent elements can be modified as appropriate without departing from the scope of the invention, such as appropriately replacing these elements by other ones having identical operational effects.

INDUSTRIAL APPLICABILITY

As described above, according to the present invention, an end plate for a suspension member that can realize weight saving, while realizing high strength and stiffness can be provided with a simple configuration suitable for mass production. Therefore, because of its general purposes and universal characteristics, applications of the present invention can be expected in a wide range in the field of a suspension member for the body of a movable body such as a vehicle.

The invention claimed is:

1. An end plate, made of metal, of a suspension member to be attached to the suspension member, the end plate comprising:
    an outer wall portion to which a wheel-side member is to be attached;
    an inner wall portion to be arranged inside the suspension member, facing the outer wall portion;
    a side peripheral-wall portion connecting a peripheral end of the outer wall portion and a peripheral end of the inner wall portion with each other;
    a through hole causing a central part of the outer wall portion and a central part of the inner wall portion to communicate with each other, into which an intruding portion provided in the wheel-side member is to intrude;
    a first press-formed portion extending along a peripheral edge of the through hole in the inner wall portion and formed with a recessed portion in which the inner wall portion is depressed;
    a second press-formed portion arranged in a part of a peripheral edge on a side of the peripheral end of the inner wall portion, which is a remnant of a portion where the first press-formed portion is arranged in the inner wall portion, and formed with a protruding portion in which the inner wall portion is protruded; and
    a screw hole formed in the protruding portion of the second press-formed portion to penetrate the protruding portion, causing the outer wall portion and the inner wall portion to communicate with each other,
    with the recessed portion of the first press-formed portion being thinned and the protruding portion of the second press-formed portion being thickened both with respect to a portion of the second press-formed portion in which the protruding portion is not formed, in a plate thickness of the end plate.

2. The end plate for a suspension member according to claim 1, wherein
    the recessed portion in the first press-formed portion is formed by press molding to apply a pressing force directed from the inner wall portion toward the outer wall portion, and
    the protruding portion in the second press-formed portion is formed by press molding to apply a pressing force directed from the outer wall portion toward the inner wall portion.

3. The end plate for a suspension member according to claim 1, wherein the protruding portion in the second press-formed portion is arranged in plural so as to surround the recessed portion in the first press-formed portion.

4. The end plate for a suspension member according to claim 1, wherein the portion of the second press-formed portion in which the protruding portion is not formed has a rib shape having a plate thickness maintaining a plate thickness of a plate-like base member of the end plate.

5. The end plate for a suspension member according to claim 4, wherein the rib shape extends to connect protruding portions each in which the protruding portion is provided and which are arranged so as to surround the recessed portion in the first press-formed portion.

* * * * *